United States Patent [19]

May et al.

[11] Patent Number: 4,513,992

[45] Date of Patent: Apr. 30, 1985

[54] DATA CARRIER HAVING A PICTURE THEME SUPERIMPOSED BY A LINE PATTERN AND A METHOD OF PRODUCING SAME

[75] Inventors: Stefan May, Herbertshausen; Hans Müller, Munich, both of Fed. Rep. of Germany

[73] Assignee: GAO Gesellschaft fur Automation and Organisation mbH, Munich, Fed. Rep. of Germany

[21] Appl. No.: 599,429

[22] Filed: Apr. 12, 1984

Related U.S. Application Data

[62] Division of Ser. No. 307,981, Oct. 2, 1981, Pat. No. 4,459,020.

[30] Foreign Application Priority Data

Oct. 9, 1980 [DE] Fed. Rep. of Germany ....... 3038179

[51] Int. Cl.[3] ....................... B42D 15/00; G03B 27/02

[52] U.S. Cl. .................................... 283/94; 101/194; 283/58; 283/902; 283/904

[58] Field of Search ....................... 101/194, 211, 426; 283/57, 58, 59, 94, 113, 114, 902, 72, 904; 355/79, 132, 133

[56] References Cited

U.S. PATENT DOCUMENTS

| | | | |
|---|---|---|---|
| 2,984,030 | 5/1961 | Hannon | 283/904 X |
| 3,533,176 | 10/1970 | Weitzberg et al. | 283/904 X |
| 3,610,120 | 10/1971 | Morse et al. | 283/91 X |
| 3,807,852 | 4/1974 | Hoydil | 283/75 X |
| 3,827,726 | 8/1974 | McJoy et al. | 283/75 X |
| 4,066,280 | 1/1978 | Lagapria | 283/91 X |
| 4,360,548 | 11/1982 | Skees et al. | 283/72 X |

FOREIGN PATENT DOCUMENTS

| | | |
|---|---|---|
| 503863 | 9/1979 | Australia . |
| 1066109 | 11/1979 | Canada . |
| 1070731 | 1/1980 | Canada . |
| 1231215 | 5/1972 | United Kingdom . |
| 2044675 | 10/1980 | United Kingdom . |

*Primary Examiner*—Paul A. Bell
*Attorney, Agent, or Firm*—Neuman, Williams, Anderson, Olson

[57] ABSTRACT

A data carrier, in particular check paper, having a picture theme printed on by the dot screen, grain screen, line-halftone combination or special screen techniques or as a line copy, which is printed over by a security pattern serving the purpose of protecting the data carrier. The picture theme is interrupted by a negative security pattern adapted to the security pattern, into which negative security pattern the security pattern is printed congruently. The lines of the negative security pattern are preferably wider than the lines of the security pattern, so that the lines of the security pattern integrated into the picture theme are at a certain distance from the lines of the negative security pattern in the entire picture area and do not touch the picture theme.

12 Claims, 9 Drawing Figures

Figure 1:
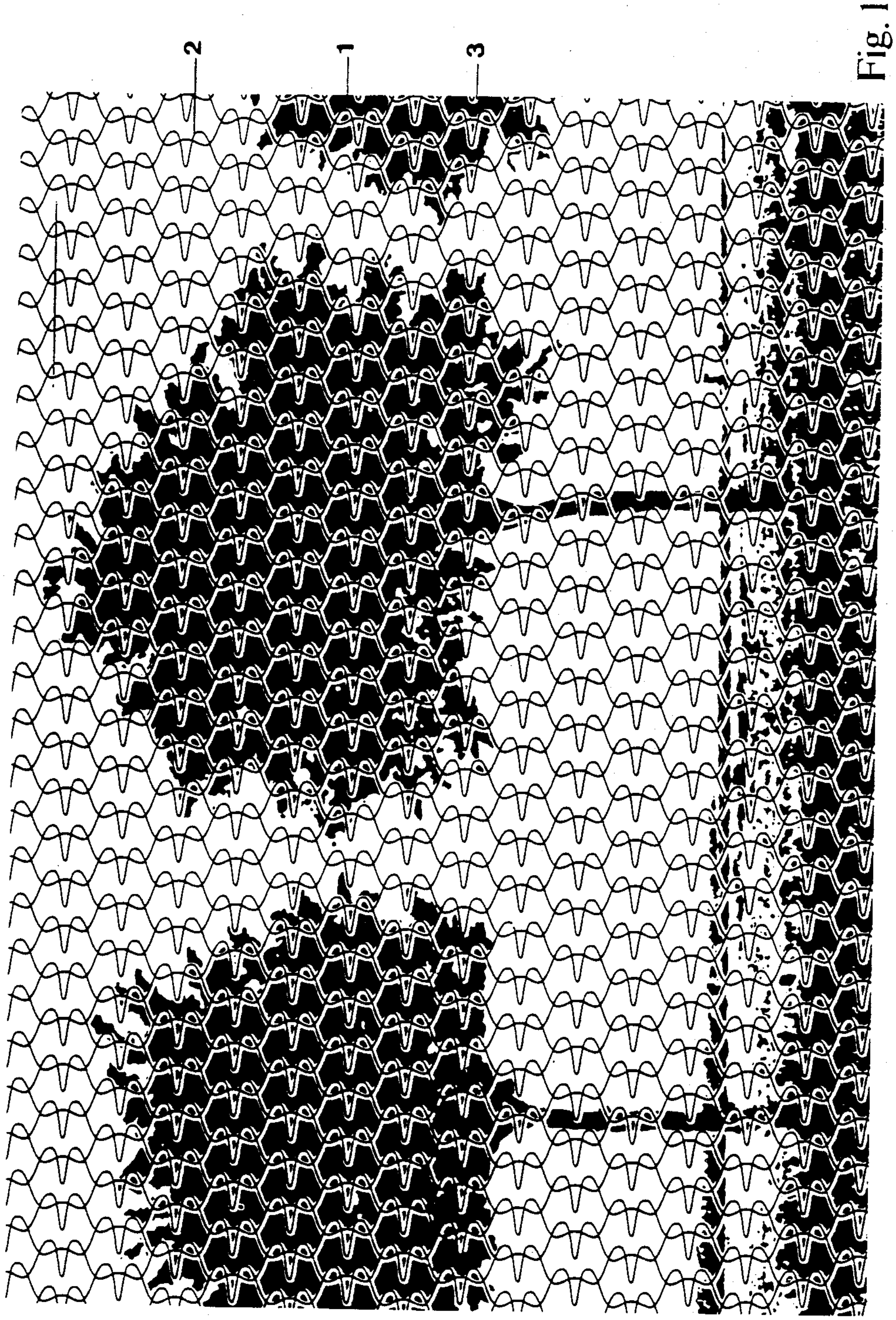

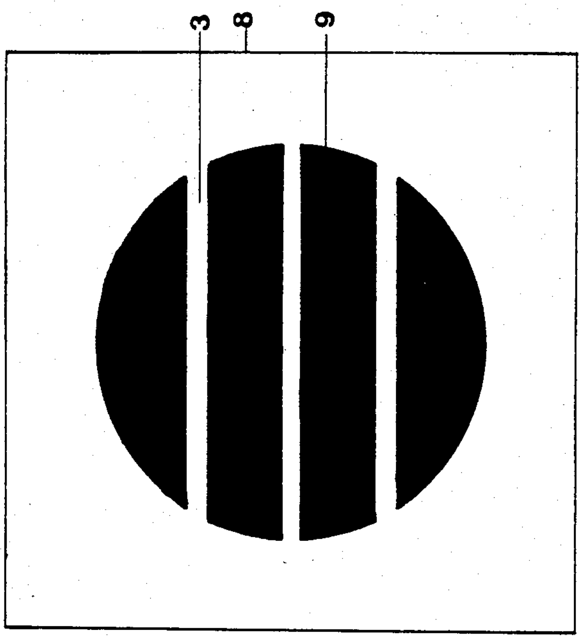
Fig. 3c
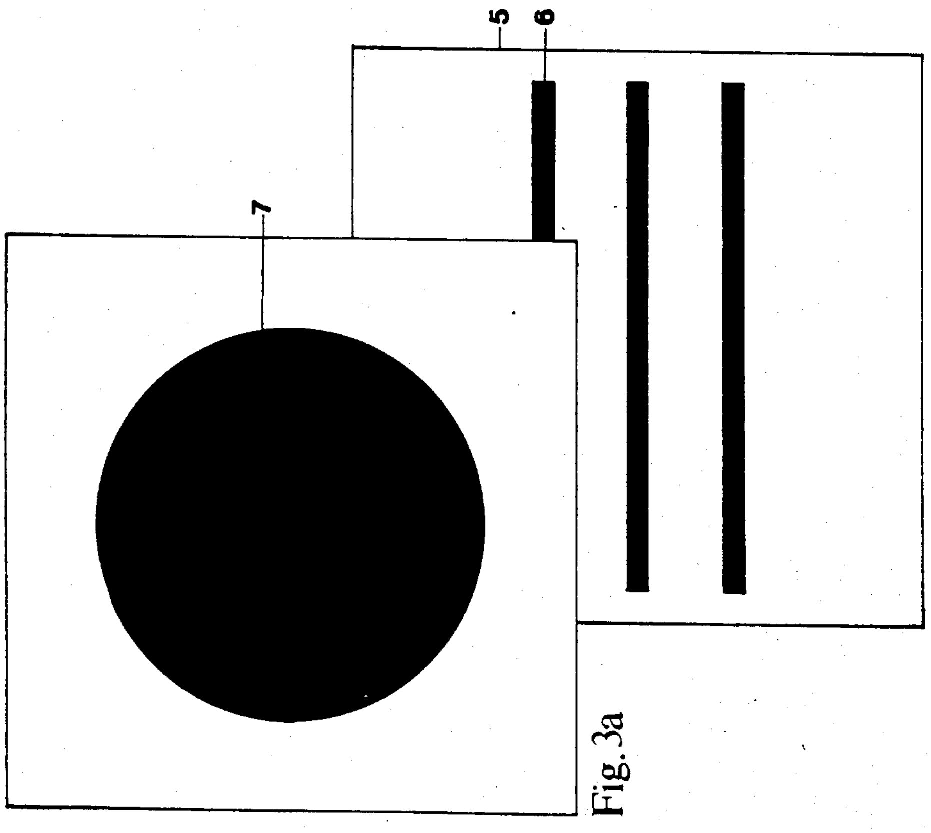
Fig. 3b
Fig. 3a

DATA CARRIER HAVING A PICTURE THEME SUPERIMPOSED BY A LINE PATTERN AND A METHOD OF PRODUCING SAME

SPECIFIC DESCRIPTION

This is a division of application Ser. No. 307,981 filed Oct. 2, 1981 now U.S. Pat. No. 4,459,020 the text of which is hereby incorporated by reference.

The invention concerns a data carrier, in particular check paper, having a printed picture theme superimposed by a security pattern in the form of a line pattern which is also printed, as well as a method of producing this type of data carrier and picture theme.

It is known particularly in the production of check paper, securities, identification cards and so on, to print security patterns, e.g. guilloches, over picture themes in order to prevent the imitation or forgery of this type of data carrier. The U.K. Pat. No. 1,231,215, for example, describes an identification card in which a photograph of the card owner provided in the identification card is protected against manipulation by means of a guilloche overprint.

Since the security pattern is printed over a large area of the picture theme without any additional measures being taken, the production of security prints by this method can be carried out relatively easily and cheaply. But the disadvantage that has emerged is that color mixtures arise in the areas in which the picture theme and the security patterns are printed one over the other, so that the continuity of color in the line is disturbed.

The security pattern is either quite impossible or else very difficult to recognize in the area of the picture theme when the picture theme and the security pattern are in the same color or the picture theme is very dark. This type of protection technique is therefore only used for security prints of simple quality.

To avoid this type of disadvantage it is customary, especially in banknote printing, to insert picture themes in openings or windows of the guilloche background print. In such cases the picture themes are usually produced by high quality steel gravure printing which itself offers good protection against forgery in spite of the lack of guilloche pattern on the picture theme.

However, the disadvantage is that the part of the surface where the picture theme is reduces the surface that can be used for the background print and that therefore the protection against tampering and foregery that is possible by means of guilloche background prints is reduced quite considerably in the case of larger picture themes. The security guidelines that exist (stock exchange guidelines), which require, among other things, a minimal area for the guilloche background, do not allow the use of picture themes covering the entire surface for securities which are bound to these guidelines.

Avoiding some of the disadvantages of the first method mentioned above, in which the picture theme is printed over by the security pattern, a further method of producing identification cards became known, in which photographs can be protected even in their black areas by clearly recognizable guilloche lines (see U.K. Pat. No. 2,044,675A).

It was proposed that for better recognizability of the security pattern the area of the photo be provided with a security pattern even before exposure, so that after exposure the exposed areas of the picture theme are interrupted by an unexposed security pattern and thus the lines of the guilloche pattern can still be recognized just as well.

In spite of the obvious advantages of this method it proves to be disadvantageous that this technique is only possible in connection with picture themes applied photographically. It is not possible to exploit its advantages for other data carriers without photographic means.

The invention is therefore based on the problem of creating a data carrier or a picture theme as well as a method of producing picture themes and printing plates necessary for this, which can also be protected by a security pattern in the area of the picture and that does not rely on photographic techniques for the production of the data carriers.

This problem is solved according to the invention by the features stated in the appended claims.

In a development of this invention a guilloche pattern is used as a security pattern disposed congruently in the lines of a negative security pattern. The latter comprises an interruption or break in the picture theme and has lines somewhat wider than those of the security pattern. Thus, the guilloche lines are close to each side of the picture theme and thus cross the picture theme as free lines without touching it. The picture theme and the security patterns are chiefly carried out in colors which cannot be separated—or only with great difficulty—by reproduction techniques. Furthermore, optical effects that can be achieved by color blending techniques and so on, as they are known in the printing of check paper, are also used.

In addition, the picture theme and the security pattern are preferably applied to the data carrier by the simultaneous printing technique. The printing plates for the printing process are produced by means of multiple-stage, contact printing techniques.

Providing a negative security pattern within the printed pattern and printing the security pattern into the negative security pattern congruently opens up new possibilities in particular for the production of securities, since even the most simple picture themes can now be carried out completely independently of the size of the picture, i.e. over a large or even the entire surface, they have high-quality protection and can correspond to the stock exchange guidelines.

Especially when very narrow guilloche lines (a few 1/100 mm) and somewhat wider corresponding negative security pattern lines (some 1/100 mm wider than the guilloche lines) are used, securities are obtained which are exremely difficult to imitate due to the coloration and the fineness of the guilloche lines and negative security pattern.

The fineness of the guilloche lines and the negative security pattern is also the reason why reproduction by aid of commercial color photocopiers is ruled out, since the guilloche lines in the picture theme either disappear or rather do not appear, or blend with the picture theme, depending on how the apparatus is adjusted. Both versions can be easily recognized and distinguished from original prints even by the layman.

The possibility of using the printing techniques customary for check paper printing proves to be particularly advantageous, on the other hand, since the production of the data carrier according to the invention is possible without much adjustment when the original printing plates are available.

Since the printing plates necessary for the printing process according to the invention can be produced in a particularly economic way without adversely affecting the security, and the production of the data carriers themselves is possible without any additional trouble, the method of producing the data carriers according to the invention, taken as a whole, proves to be particularly economical in spite of the high security value which normally makes production more expensive.

Further developments and advantages are explained in more detail in the following embodiments with reference to the figures.

Figure 2B:
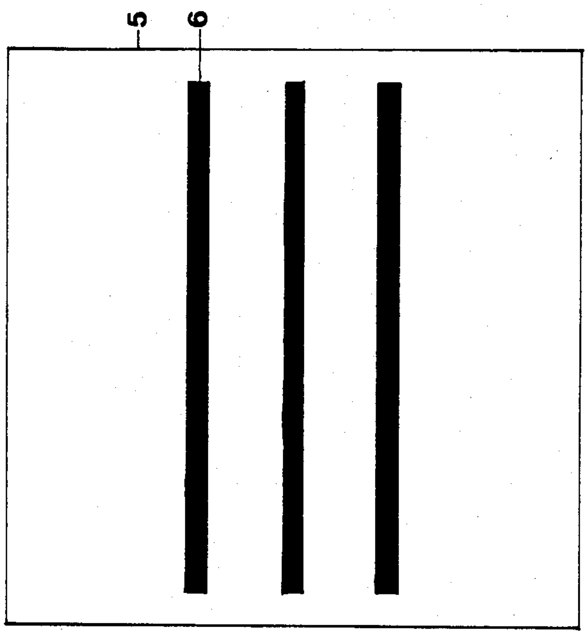
Figure 2A:
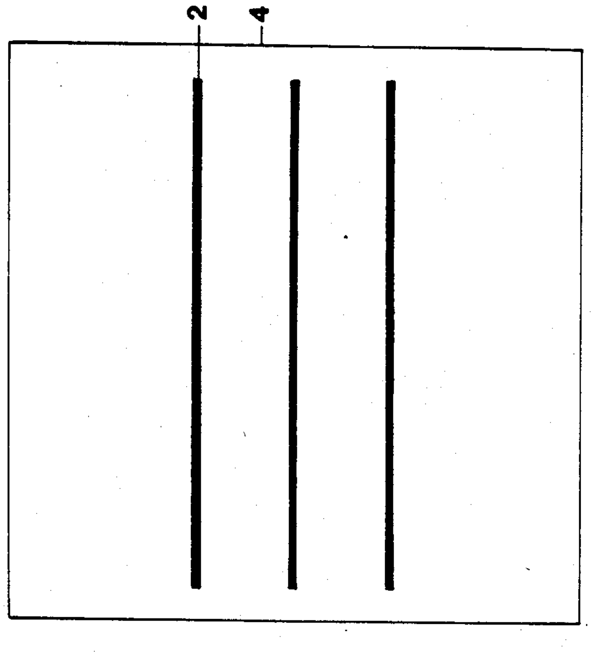

These show:

FIG. 1 an enlargement of a picture theme of one embodiment of a data carrier made pursuant to this invention superimposed by a security pattern, FIG. 2*a* lines representative of a line security pattern, FIG. 2*b* a representation of a positive image of the negative security pattern of the lines of the security pattern of FIG. 2*a*, FIG. 3*a* a representation of a picture theme (line copy), FIG. 3*b* corresponds to FIG. 2*b*, and is illustrated in underlying relationship with the picture theme of FIG. 3*a*

Figure 4C:
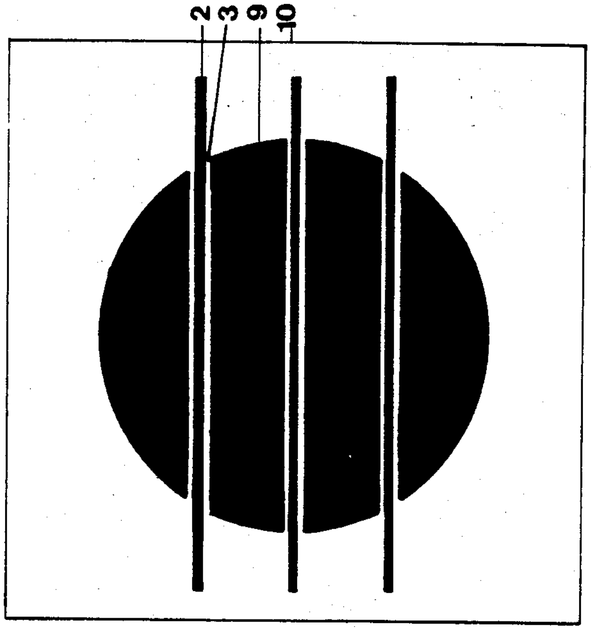
Figure 4B:
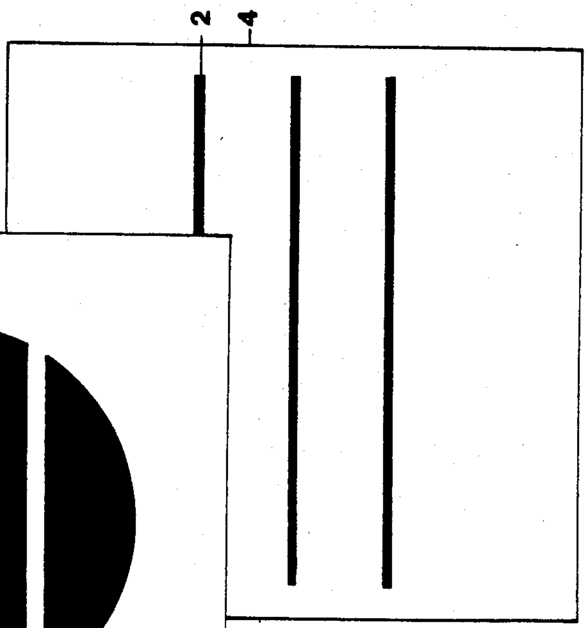
Figure 4A:
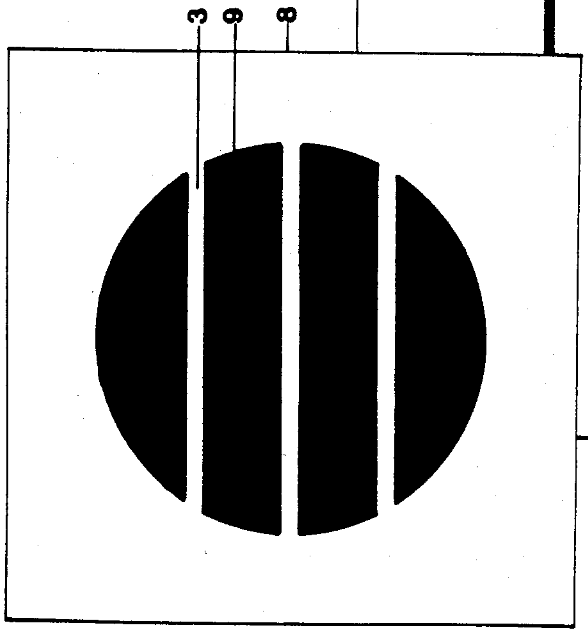

FIG. 3*c* the picture theme of FIG. 3*a* after the negative security pattern of FIG. 3*b* has been removed therefrom (line copy), FIG. 4*a* corresponds to FIG. 3*c*, and is illustrated in overlying relationship with the security pattern of FIG. 2*a*

FIG. 4*b* corresponds to FIG. 2*a*,

FIG. 4*c* a picture theme made in accordance with the teachings of this invention having congruent security line patterns extending therethrough.

FIG. 1 shows an enlargement of a picture theme 1 according to the invention, which is the silhouette of a group of trees in the present case. The picture theme 1 is superimposed by a guilloche pattern 2, which is used as a security pattern. To show things more clearly, the picture theme 1 and the guilloche 2 are both rendered black in contrast. But it is recommended that for practical use, as is described in detail in the following, two or more different contrastive colors be used, which cannot be separated—or only with great difficulty—by reproduction techniques.

As can be seen in the figure, the picture theme 1 is interrupted by a negative security pattern 3 which is exactly adapted to the guilloche pattern 2, and which the guilloche pattern 3 is congruently worked into. Although the picture theme 1 itself is very simply designed, the entire representation is so elaborate in its structure and fineness due to the working in of the guilloche pattern 2 that an imitation by hand can be ruled out. This is even more so as the guilloche lines 2 have in the original a width of c. 5/100 to 7/100 mm when they are carried out with the fineness customary in check paper printing. When the fitting precision that is possible in mass production in check paper printing is used, these lines can be fitted into a negative security pattern having a width of c. 15/100 to 20/100 mm. The distance between the lines and the edge of the negative security pattern is thus c. 5/100 to 7/100 mm.

The production of printing plates to print such a fine line pattern into the equally fine negative security pattern involves quite considerable difficulties when the usual production methods are used, even for the expert.

Due to the high demands made on the fitting precision over the entire surface, the printing over of the patterns usually also causes considerable problems. With the help of the methods of producing the printing plates and the printed forms according to the invention, these difficulties can, however, be reduced to a minimum which is well manageable even in mass production.

In this sense the production of this type of printed pattern is possible in the most simple form when the interrupted picture theme and the guilloche pattern are provided on the same printing plate. In this way the printing of the data carrier can be carried out in just one printing process.

The protection against forgery is considerably increased by a representation in two or more colors in which either the picture theme and the guilloche are different colors or preferably the picture theme and a part of the guilloche pattern are one color and the rest of the guilloche is printed in the other colors. For this purpose the structures of both colors should be provided on separate printing plates which would then normally be printed one over the other in separate printing processes. Due to the enormous fitting difficulties arising in this way, which are further increased for the above-mentioned fineness by the misalignment of the paper between or during the printing processes, printing by the simultaneous printing method proves to be particularly advantageous, as the various printing inks are first united on an intermediate carrier and then transferred from the latter to the data carrier in just one printing process.

In this way the printing of the data carrier is reduced to just one printing process again and thus completely rules out fitting problems due to paper misalignment and the differing adjustment of different printing groups. Furthermore, the individual printing plates can be very precisely positioned to each other due to the intermediate carrier which is quite free of misalignment, and the printing quality is constant even in mass production relatively independently of the paper that is to be processed.

A further variant arises when the picture theme is printed e.g. in one color and the rest of the printing area (the negative picture theme)—also provided with a negative security pattern—is printed in another color. The security pattern as above is printed into this printed pattern covering the surface either in the color of the picture theme or in that of the background. In this version, which of course can be also carried out in several colours in any other way, there is a printed pattern independent of the picture theme and covering the entire surface, which extends the selection of possibilities of design very suitably, especially in respect to color.

The production of the printing plates necessary for the printing process is based according to the invention on the contact printing technique, by means of which all demands made on quality and fineness can be sufficiently met in an economical way in the case of separate original guilloches and an original picture theme.

In this connection it must be particularly emphasized that these demands can only be met with photographic means when original guilloches are available, which can still be produced with great technical effort and handicraft skill by only a few check paper printing houses, and the original picture theme is available. When the guilloches and the picture theme are combined according to the invention and printed together onto a data carrier, the reproduction of the data carrier, e.g. by means of photographic separation, is no longer possible as long as the fineness is sufficient and the colors are correctly selected.

The method of producing the printing plates shown in FIGS. 2 to 4 is composed of several steps. As shown in FIGS. 2*a* and 2*b*, the first step consists in making a contact copy 5 of the original guilloche 4 that is so highly exposed that the lines 6 that appear in the contact copy and are later used as a negative security pattern lines are just as wide as the guilloche lines 2 or suitably wider, depending on whether the negative security pattern lines that interrupt the subsequent printed pattern are to be equally wide as or wider than guilloche lines.

According to a preferred embodiment a negative security pattern (FIG. 2*b* shows a positive image of the negative security pattern) is produced which is approximately three times as wide as the guilloche line itself.

In a parallel step of the method, a line copy 7 (FIG. 3*a*) is made of the original picture theme showing the picture in very strong contrast without any halftones. To obtain a general impression that can be quickly apprehended, a simple and relatively unstructured representation is preferably selected for the picture theme. In principle, however, very finely structured and detailed representations and picture themes having halftones that can be processed by printing techniques (grain screen, dot screen, line-halftone combination or special screen) can also be used.

The next step, shown in FIG. 3, consists in copying the negative security pattern 6 (FIG. 3*b*) obtained via the contact copy out of the line copy 7 (FIG. 3*a*) of the picture theme, by making (sandwich technique) and the copy 8 (FIG. 3*c*) from the negative (not shown) of the line copy 7 and the positive of the contact copy 5.

If in the subsequent printing process the picture theme 7 and the guilloche 2 are to be printed in the same color, the original guilloche 2 (FIG. 4*b*) is copied into the picture theme 9 (FIG. 4*a*) provided with a negative security pattern obtained in the last procedural step, fitting precisely, as shown in FIG. 4. This is done by making a copy 10 (FIG. 4*c*) of the superimposed films of the picture theme 9 and the original guilloche 2, which copy is used as the original film for the production of the printing plates.

If the picture theme and the guilloche are shown on the data carrier in several colors, the film 8 of the picture theme provided with the negative security pattern is either used directly as the original film of the corresponding printing plate, or only a part of the guilloche pattern 2 is copied into the negative security pattern of the picture theme, according to the above-mentioned step of the method.

If the area surrounding the picture theme is also to be printed, a printing plate to be used for this printing process must be made in an additional procedural step. Similarly to what is shown in FIG. 3, one copy is made of the positive of the picture theme 7 with the positive of the line-pattern contact copy 5 and a negative film is made of this copy as a typon for the printing plate.

Care must be taken in the production of this film that the picture theme 7 and the line pattern 6 are positioned to each other in exactly the same way, as in the corresponding procedural step concerning the "positive picture pattern" with negative contours, so that the negative contour of the picture theme and of the picture theme background complement each other exactly in the subsequent printing process and the line pattern 2 can be printed in neatly.

On the basis of the original film the production of the printing plates proceeds as in the usual production techniques familiar to the expert, which need not be further described in this connection.

What is claimed is:

1. In a data carrier such as check paper or the like having a picture theme printed thereon and also having a security pattern printed thereon, the improvement comprising a picture theme overlapped by a negative security pattern which is formed by interruptions of the printed picture theme and which is geometrically similar or identical to the form of the printed security pattern, and the printed security pattern is printed congruently into the contour of said negative security pattern.

2. The data carrier of claim 1 in which said printed security and negative security patterns are line patterns.

3. The data carrier of claim 2 in which the line patterns are guilloche patterns.

4. The data carrier of claim 2 in which the lines of said negative security pattern are of greater width than the lines of said printed security pattern.

5. The data carrier of claim 4, in which the lines of said negative security pattern are approximately three times as wide as the lines of the printed security pattern.

6. The data carrier of claim 4 in which the areas of said negative security pattern not covered by said printed security pattern provide visual contrast with said printed security pattern.

7. The data carrier of claim 1 in which the picture theme and the printed security pattern are of the same color.

8. The data carrier of claim 1 in which the printed security pattern is disposed over the total printed area of the data carrier.

9. The data carrier of claim 1 in which the picture theme is printed in one color and the rest of the printed area of the data carrier is printed in another color and both areas are interrupted by a continuous negative security pattern and the printed security pattern is printed into the contour of the negative security pattern.

10. The data carrier of claim 1 in which the picture theme is printed on in the form of a line copy.

11. The data carrier of claim 1 in which one part of the printed security pattern is printed in one color and the rest of the printed security pattern is printed in another color.

12. The data carrier of claim 1 in which the color of the surface of the data carrier on which the picture theme is printed provides visual contrast with the ink with which said picture theme is printed.

* * * * *